United States Patent
St-Denis

(10) Patent No.: US 11,818,053 B2
(45) Date of Patent: Nov. 14, 2023

(54) EXTENDING ACCEPTABLE SEQUENCE RANGE

(71) Applicant: NXP B.V., Eindhoven (NL)

(72) Inventor: Bernard Francois St-Denis, Ottawa (CA)

(73) Assignee: NXP B.V., Eindhoven (NL)

( * ) Notice: Subject to any disclaimer, the term of this patent is extended or adjusted under 35 U.S.C. 154(b) by 43 days.

(21) Appl. No.: 17/663,867

(22) Filed: May 18, 2022

(65) Prior Publication Data
US 2022/0385588 A1 Dec. 1, 2022

(30) Foreign Application Priority Data
Jun. 1, 2021 (EP) .................................. 21177260

(51) Int. Cl.
*H04L 47/34* (2022.01)
*H04L 47/32* (2022.01)

(52) U.S. Cl.
CPC ............ *H04L 47/34* (2013.01); *H04L 47/32* (2013.01)

(58) Field of Classification Search
None
See application file for complete search history.

(56) References Cited

U.S. PATENT DOCUMENTS

| | | | | |
|---|---|---|---|---|
| 6,978,384 | B1 * | 12/2005 | Milliken | H04L 47/27 709/227 |
| 8,339,974 | B1 * | 12/2012 | Dawson | H04L 65/65 370/255 |
| 9,325,586 | B1 * | 4/2016 | Mizrahi | H04L 43/0847 |
| 2002/0110095 | A1 | 8/2002 | Jiang et al. | |

FOREIGN PATENT DOCUMENTS

| | | |
|---|---|---|
| CN | 108173755 B | 7/2020 |
| WO | WO-2021/005397 A1 | 1/2021 |
| WO | WO-2021/005400 A1 | 1/2021 |

OTHER PUBLICATIONS

Danielis, et al., "Frame Replication and Elimination for Reliability in Time-Sensitive Networks," website: https://summit.omnetpp.org/2021/assets/pdf/OMNeT_2021_paper_1.pdf, pp. 1-9.

* cited by examiner

*Primary Examiner* — Anh Ngoc M Nguyen

(57) ABSTRACT

A sequence recovery method executed by a node in a time-sensitive network, the method comprising receiving a packet having a sequence number, determining whether the sequence number is within a predetermined range of a reference sequence number, wherein the reference sequence number is a current latest sequence number accepted by the node, and wherein the predetermined range comprises a history range and a future range, wherein the history range has a length equal to a history length and includes the reference sequence number and a predetermined number of consecutive sequence numbers that are immediately earlier than the reference sequence number, and the future range has a length equal to a future length and defines a predetermined number of consecutive sequence numbers that are immediately later than the reference sequence number, wherein the future length is greater than the history length.

15 Claims, 4 Drawing Sheets

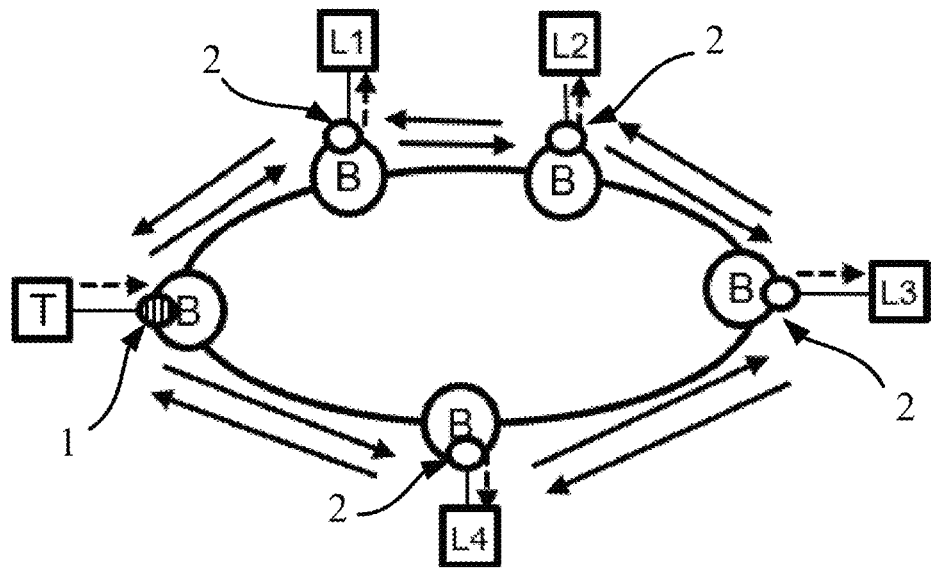
FIG. 1 – PRIOR ART
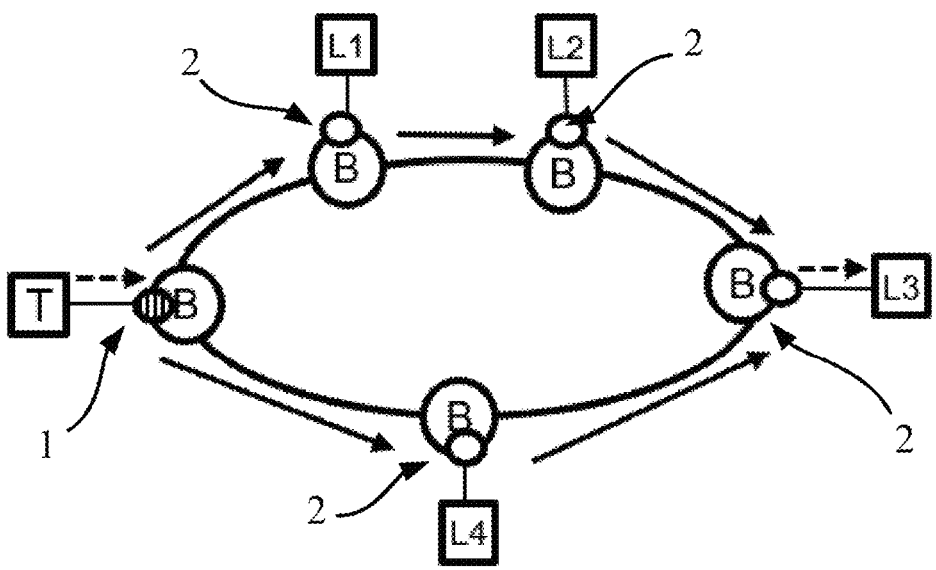
FIG. 2 – PRIOR ART

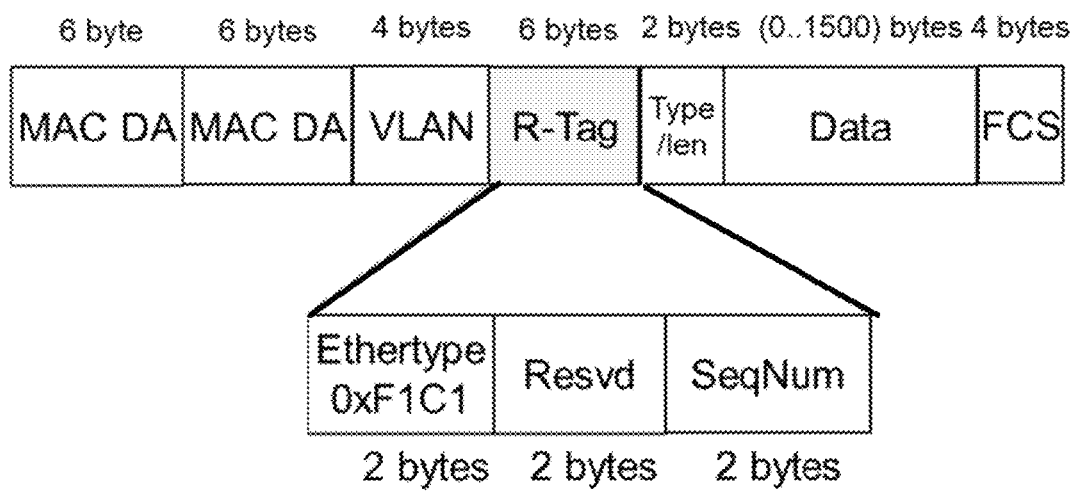
FIG. 3 – PRIOR ART
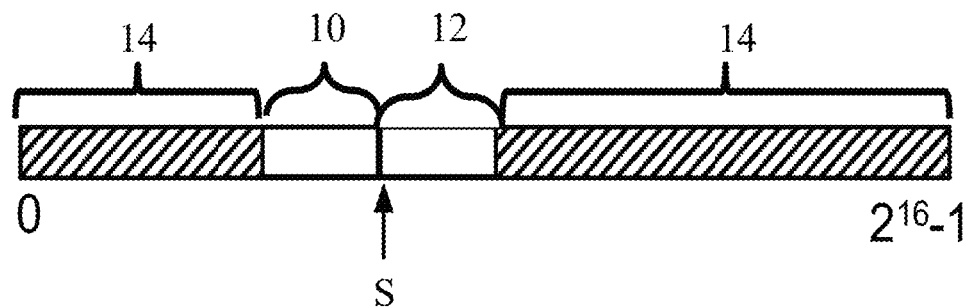
FIG. 4 – PRIOR ART

EXTENDING ACCEPTABLE SEQUENCE RANGE

BACKGROUND

The present specification relates to sequence recovery methods in a time-sensitive network.

In a time-sensitive network, TSN, packets (or frames) are duplicated and transmitted via multiple paths in the network to a destination node. This ensures that the packet is safely received by the destination node. Each packet is assigned a sequence number at a node in the network which applies a sequence generation function. When a packet is received at a node of the network, the node may review the sequence number of the received packet and eliminate any duplicate or rogue packets. This is called a sequence recovery function.

The IEEE 802.1CB standard defines the current standards for Frame Replication and Elimination for Reliability (FRER) in a TSN. This includes the current standard sequence recovery function. This standard is incorporated herein by reference in its entirety.

SUMMARY

Aspects of the present disclosure are set out in the accompanying independent and dependent claims. Combinations of features from the dependent claims may be combined with features of the independent claims as appropriate and not merely as explicitly set out in the claims.

According to a first aspect of the present disclosure, there is provided a sequence recovery method executed by a node in a time-sensitive network and configured to transmit and receive packets, the method comprising receiving a packet having a first sequence number, determining whether the first sequence number is within a predetermined range of a reference sequence number, wherein the reference sequence number is a current latest sequence number accepted by the node and wherein the predetermined range comprises a history range and a future range, wherein the history range has a length equal to a history length and includes the reference sequence number and a predetermined number of consecutive sequence numbers that are immediately earlier than the reference sequence number, and the future range has a length equal to a future length and defines a predetermined number of consecutive sequence numbers that are immediately later than the reference sequence number, wherein the future length is greater than the history length. In response to the first sequence number being outside of the predetermined range, discarding the packet, and in response to the first sequence number being within the predetermined range, accepting the packet.

It will be appreciated that the latest sequence number could equivalently be referred to as the chronologically latest sequence number. It will be appreciated that the earliest sequence number could equivalently be referred to as the chronologically earliest sequence number.

If a second packet has a second sequence number that is later than the first sequence number, this means that the second sequence number was generated at a later time than the first sequence number. This does not necessarily mean that the second sequence number was received at the node at a later time than (i.e. after) the first sequence number, as packets may arrive out of sequence. Thus, the 'current latest sequence number' is not necessarily the most recent sequence number received at the node.

The latest sequence number is not necessarily the highest sequence number. The packet sequence numbers are typically generated using modulo arithmetic (as is the standard practice). The sequence number space has a fixed size (e.g. 64K) and so when the maximum (i.e. highest) sequence number is issued (e.g. Hex "FFFF") the sequence number will rollover to the lowest sequence number (e.g. Hex "0000"). Thus, sequence number "0000" is considered to be later than sequence number "FFFF". This is acceptable if the sequence number "0000" is far removed from "FFFF" (i.e. the sequence number space is sufficiently large).

Thus, the latest sequence number may be referred to as the highest sequence number, wherein the lowest sequence number in the modulo sequence recovery space may be considered to exceed the highest sequence number by one, due to the rollover process detailed above. The history range may equivalently include the reference sequence number and a predetermined number of consecutive sequence numbers that are immediately lower than the reference sequence number. The future range may equivalently define a predetermined number of consecutive sequence numbers that are immediately higher than the reference sequence number.

The predetermined range may equivalently be referred to as the acceptance range.

The method may comprise updating the reference sequence number to be the first sequence number in response to the first sequence number being within the future range.

In response to the first sequence number being within the future range, the method may include updating a sequence history bit vector to store the first sequence number, wherein the sequence history bit vector has a length equal to the history length. The sequence history bit vector is defined in the IEEE 802.1CB standard.

In response to the packet being within the history range, the method may include determining if the first sequence number has already been received by the node. In response to determining that the first sequence number has already been received by the node, the method may comprise discarding the packet. Thus, duplicate packets may be discarded.

In response to determining that the first sequence number has not already been received by the node, the method may include updating the sequence history bit vector to store the first sequence number.

Optionally, the future length is defined independently of the history length.

Optionally, the future length is set by the user.

The method may comply with the IEEE 802.1CB standard vector sequence recovery method. Thus, the present disclosure builds on or enhances the IEEE 802.1CB standard.

The reference sequence number may be defined by a RecovSeqNum variable, as defined in the IEEE 802.1CB standard.

The history range may be defined by a frerSeqRcvyHistoryLength variable, as defined in the IEEE 802.1CB standard.

According to a second aspect, the present disclosure provides a node for a time-sensitive network and configured to transmit and receive packets, the node comprising: a receiver; a processor; and a memory configured to store a set of sequence numbers, a future length and a history length, wherein the processor is configured to: in response to the receiver receiving a packet having a first sequence number, determine whether the first sequence number is within a predetermined range of a reference sequence number, wherein the reference sequence number is a current latest sequence number stored in the memory and wherein the predetermined range comprises a history range and a future range, wherein the history range has a length equal to the history length and includes the reference sequence number and a predetermined number of consecutive sequence numbers that are immediately earlier than the reference sequence number, and the future range has a length equal to the future length and defines a predetermined number of consecutive sequence numbers that are immediately later than the reference sequence number, wherein the future length is greater than the history length; in response to the first sequence number being outside of the predetermined range, discard the packet; and in response to the first sequence number being within the predetermined range, accept the packet.

The set of sequence numbers stored in the memory may be stored as a SequenceHistory bit vector having a length equal to the history length. The SequenceHistory bit vector is defined in the IEEE 802.1CB standard.

The processor may be configured to perform the sequence recovery method of any embodiment or example of the first aspect of the disclosure.

Optionally, the node is a networking device or a bridge.

According to a third aspect, the present disclosure provides a time-sensitive network (TSN) comprising a plurality of inter-connected nodes as described in any embodiment or example of the second aspect of the disclosure.

Optionally, the time-sensitive network (TSN) is an in-vehicle network.

According to a fourth aspect, the present disclosure provides a vehicle comprising an in-vehicle network as described in the third aspect of the disclosure.

BRIEF DESCRIPTION OF THE DRAWINGS

Embodiments of this disclosure will be described hereinafter, by way of example only, with reference to the accompanying drawings in which like reference signs relate to like elements and in which:

FIG. 1 shows a prior art representation of a TSN forwarding a packet in broadcast mode;

FIG. 2 shows a prior art representation of a TSN forwarding a packet in unicast mode;

FIG. 3 is a diagram showing the components in an Ethernet frame according to the prior art;

FIG. 4 is a logical representation of a sequence recovery method according to the prior art;

DETAILED DESCRIPTION

Figure 5:
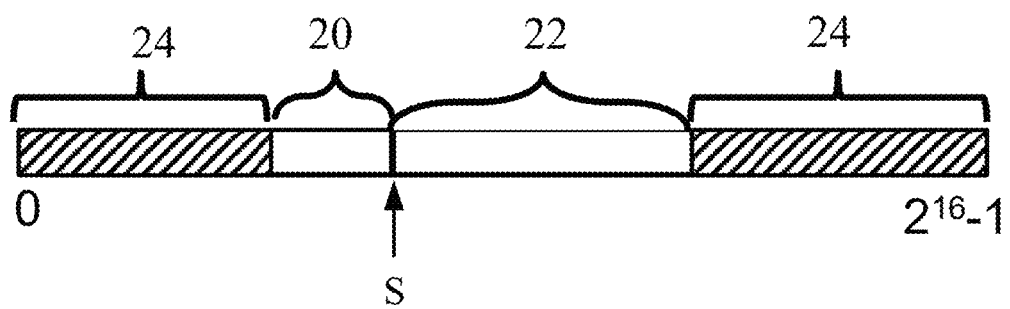
FIG. 5 is a logical representation of a sequence recovery method according to an embodiment of this disclosure.

Embodiments of this disclosure are described in the following with reference to the accompanying drawings.

FIG. 1 shows a prior art representation of a time-sensitive network (TSN) for a packet forwarded in broadcast mode. For example, the TSN may be an Ethernet ring. The network comprises a talker or host node, T, which is connected to a plurality of listeners, L1, L2, L3, L4, by a plurality of bridges (or bridge ports) B. Each of the bridges B is a node in the TSN.

The bridge B in direct communication with the talker T executes a sequence generation function 1 which is configured to replicate packets transmitted by the talker T and to allocate a sequence number to each packet (or frame). In accordance with the IEEE 802.1CB standard for Frame Replication and Elimination for Reliability (FRER), the bridge sends duplicate copies of each packet over multiple disjoint paths in the network. This ensures reliability, as even if there is a fault along one path of the network, the packets should still be safely received by the listeners L1, L2, L3, L4.

Each of the bridges B connected to one of the listeners L1, L2, L3, L4 are configured to execute a sequence recovery function 2. In broadcast mode, packets are transmitted to each of the listeners, so all of the sequence recovery functions 2 are used. The sequence number allocated to a packet is effectively an identification number. The sequence recovery functions 2 use the sequence numbers of the received packets to discard duplicate packets.

FIG. 3 is a diagram showing the components in an Ethernet frame (according to the prior art). As illustrated, the sequence number (SeqNum) is contained in the Redundancy tag (R-tag) of the frame.

FIG. 2 shows the same TSN network as in FIG. 1 but for a packet forwarded in unicast mode. In this example, only the bridge connected to listener L3 executes a sequence recovery function 2. The other bridges simply forward the received packets along the network.

In the IEEE 802.1CB standard, a node's sequence recovery function assumes, under a no packet loss condition, that it receives all packets from a given source generating the sequence number. This is the case for streams identified by the destination address. However, for sequence generation and recovery functions identified by the source address, this cannot be guaranteed. This causes the sequence recovery function to incorrectly identify and discard packets as rogue packets, even if there is no packet loss in the network. Therefore, when the source address is used to identify the IEEE 802.1CB standard sequence recovery and generation function, the sequence recovery function defined is overly constrained and can result in unnecessary packet discards.

The main reason why a user may want to utilize the source address (rather than the destination address) to identify sequence recovery and generation functions is for scalability and manageability reasons. In the examples shown in FIGS. 1 and 2, assuming each node can be both a listener and a talker, each bridge B would require one sequence generation function 1 and four sequence recovery functions 2. Adding a new network device (i.e. Talker/Listener) connected to an existing bridge or adding a bridge to the network would only require the TSN management system to configure one extra sequence generation function to the bridge where the new device resides and one extra sequence recovery function to each bridge. In comparison, if sequence generation and recovery function is based on the destination address, each bridge would require one sequence generation function per destination address (e.g. n sequence generation functions per bridge). In the network shown in FIGS. 1 and 2, n=5 (4 listener address+1 broadcast address), so the network would require n(n−1)=20 sequence recovery functions at each bridge.

FIGS. 1 and 2 are example TSN networks where the sequence generation 1 and recovery functions 2 are identified by the Talker (T)'s source address. Only those packets which are received by the Listener(s) Lx pass through the sequence recovery function 2. As explained above, FIG. 2 shows the network operating in a unicast mode, wherein only L3 receives packets from the source (T). For example, if packets having sequence numbers S, S+1 . . . S+n are generated at the source sequence generation function 1, then each of the sequence recovery functions 2 will expect to receive each of these sequence numbers. However, if these packets are transmitted in unicast mode from talker T to listener L3 (see FIG. 2) then the sequence recovery functions connected to L1, L2, and L4 will not receive these packets and would eventually count these missed sequence numbers (S, S+1 and S+2) as loss packets.

In addition, if too many unicast frames (or packets) are transmitted to L2, L3 and L4 before say L1 receives a frame, L1 may inadvertently discard its packet because the sequence number received is outside of the range of sequence numbers it is expecting to receive. This is described in more detail below.

FIG. 4 shows a logical view of a sequence recovery function with a modulo sequence recovery space of $2^{16}$. The sequence recovery function may be executed by a node in a TSN network (e.g. one of the bridges in FIG. 1 or 2). The IEEE 802.1CB standard sequence recovery function defines a predetermined range 10, 12, of acceptable sequence numbers relative to a reference sequence number S. The lower range 10 is called the history range. The history range has a length equal to a history length and includes the reference sequence number S and a predetermined number of consecutive sequence numbers earlier than the reference sequence number S. This is called the history range as the sequence numbers that are earlier than the reference sequence number S were issued (generated) at an earlier time than the reference sequence number S. The upper range 12 is called the future range, as this defines a predetermined number of sequence numbers that were issued at a later time than the reference sequence number S.

The remainder of the sequence recovery space not taken up by the predetermined range 10, 12 is often called the rogue range 14.

The reference sequence number S is the current latest sequence number received at the node (not including any rogue discarded sequence numbers). The sequence generation and recovery functions typically use modulo arithmetic, such that there is a rollover of sequence numbers at the maximum sequence number. The initialization (or minimum) sequence number is therefore considered to be later than the maximum possible sequence number. Thus, the highest sequence number may not always be the latest sequence number.

The current latest sequence number is identified by the RecovSeqNum variable. The IEEE 802.1CB standard defines the RecovSeqNum variable as follows: The RecovSeqNum variable holds the latest sequence number value received (in modulo RecovSeqSpace), or the value (RecovSeqSpace−1), if no sequence numbers have been received since the sequence recovery function was reset. The variable is an unsigned integer in the range 0 to (RecovSeqSpace−1). RecovSeqSpace is defined in section 7.4.3.2.1 of the IEEE 802.1CB standard. The RecovSeqNum is initialized to (RecovSeqSpace−1) whenever the function is reset (see section 7.4.3.3 of the standard). When the RecovSeqNum is incremented past its maximum value, the new value is 0. Thus, the predetermined range 10, 12 is not fixed but moves with the reference sequence number S.

According to the standard, only the history length (HLEN) of the history range 10 is defined. The length of the future range 12 is defined as equal to the history length (HLEN). The history length (HLEN) is a well-known term of the art, as would be appreciated by the skilled person.

Generally, the history length is small (less than 16 sequence numbers) and is determined based on the highest latency difference between the shortest and longest path between the source node (i.e. talker) and the destination node's (i.e. listener's) sequence recovery function. This latency difference is then converted to the number of packets (representing the history length) based on the stream rate and packet size. Thus, according to the IEEE 802.1CB standard the predetermined range (or acceptance range) 10, 12 is quite small and restrictive.

If the node receives a packet having a sequence number that is outside of the predetermined range 10, 12 from the latest sequence number S (i.e. within the rogue range 14) then the packet is discarded as a rogue packet. If the node receives a packet having a sequence number that is within the predetermined range 10, 12 from the highest sequence number S then the packet is accepted. As long as the accepted packet is not a duplicate packet, the sequence number is stored in a sequence history bit vector, as defined in the IEEE 802.1CB standard. The sequence history bit vector has a length equal to the history length (HLEN) and records the sequence numbers that are within the history range 10.

In an example according to the standard, the history range 10 and the future range 12 may have a length of 3. The node may receive a first packet having a sequence number 7 (which is the current latest sequence number S) and so the history range extends from sequence number 5 to 7 (having a length of three) and the future range extends from sequence number 8 to 10 (having a length of three). If the node receives a second sequence number 16 then this will be discarded, as it is outside of the predetermined range of 5 to 10. However, if the sequence number generation is based on the source address, then the node may not be intended to receive packets having sequence numbers 8 to 15, thus sequence number 16 may incorrectly be discarded as a rogue packet.

A possible option for addressing this would be to increase the history length, HLEN, thereby increasing the predetermined range. However, this is not an acceptable solution as it is costly to implement large history ranges in hardware. This is because increasing the history length increases the length of the SequenceHistory bit vector, thereby increasing the number of sequence numbers that must be stored.

Figure 6:
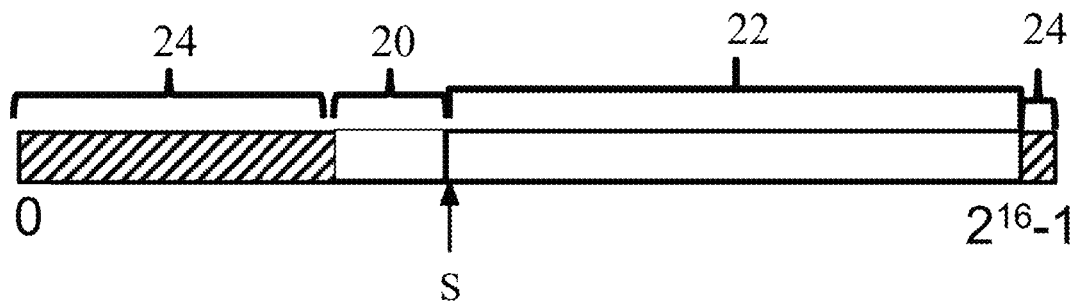
FIG. 6 is a logical representation of a sequence recovery method according to an embodiment of this disclosure.

The present disclosure provides an alternative solution to this problem, as shown in FIGS. 5 and 6. In FIGS. 5 and 6, the future range 22 has a length that is greater than the length of the history range 20. Thus, the future length is greater than the history length. By increasing the size of the future range 22 compared to the IEEE 802.1CB standard, the risk of packets incorrectly being discarded as a rogue packet is reduced. However, the length of the history range 20 may not be increased, so there is no requirement to increase hardware storage.

The future range 22 may be defined by a new configurable variable stored in the memory of the node (e.g. in SRAM). The extended future range 22 extends the acceptable range of sequence numbers relative to the latest received sequence number S identified by the RecovSeqNum variable stored in the memory. As shown in FIG. 5, the future range 22 may have a length (i.e. the future length, or FLEN) defined as approximately double the history length (HLEN). As shown in FIG. 6, the future range 22 may have a length greater than double the history length. However, it will be appreciated that the length of the future range 22 may be set to any value that is greater that the length of the history range 20. In comparison to the prior art, the length of the future range 22 is defined independently to the length of the history range 20.

Figure 7:
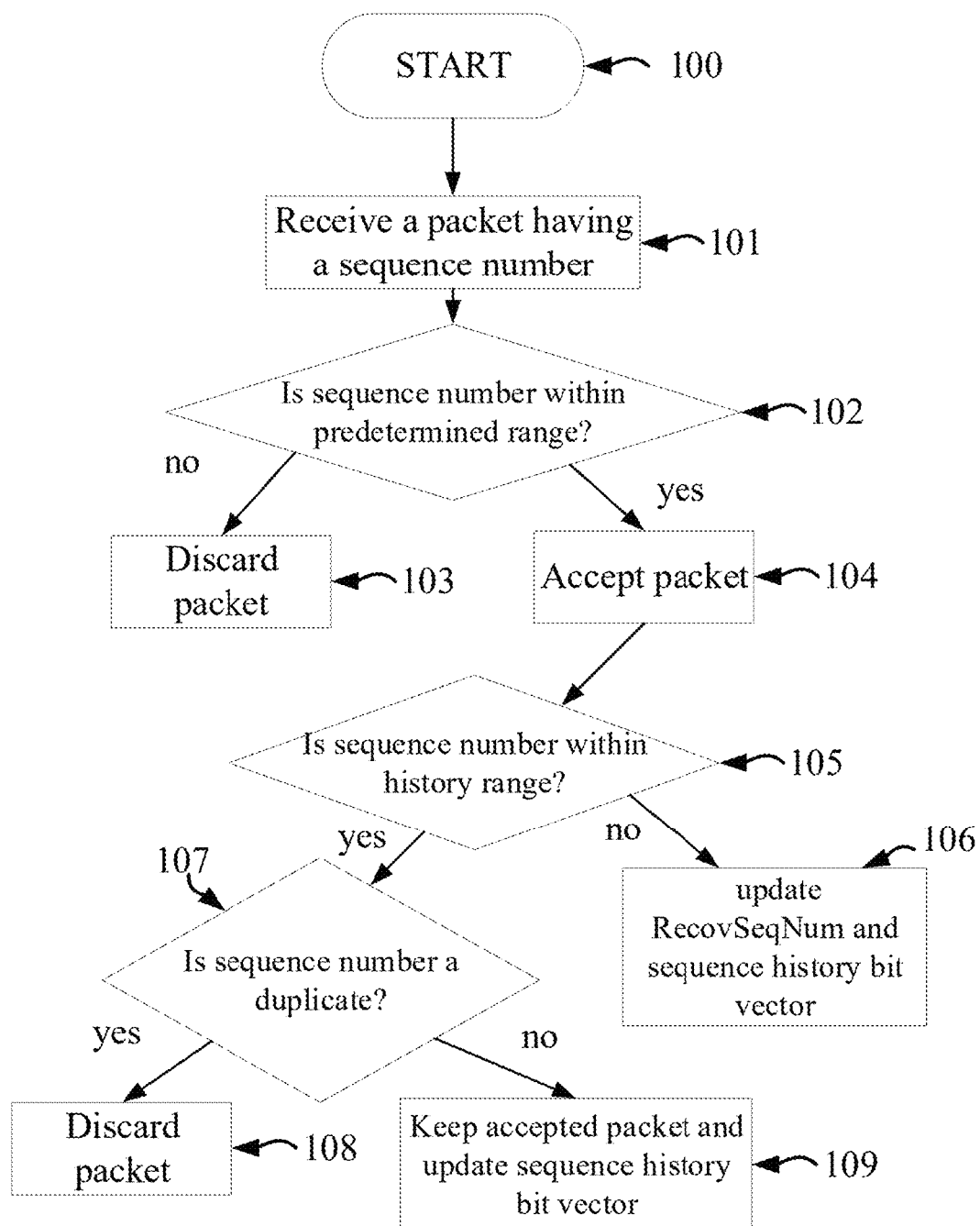
FIG. 7 is a flow diagram illustrating a portion of a sequence recovery method according to an embodiment of this disclosure.

The operation of the sequence recovery method according to this disclosure will now be described, as shown in FIG. 7. At step 100 the method starts. At step 101 the node receives a packet having a sequence number. The node then reviews whether the sequence number falls within the predetermined range 20, 22 of the current latest sequence number accepted at the node, S (step 102).

If the sequence number is outside of the predetermined range 20, 22 then the packet is discarded as a rogue packet (step 103).

If the sequence number is within the predetermined range 20, 22 of the current latest sequence number received, S, then the packet is accepted (step 104). For example, if the history range 20 has a history length HLEN and the future range 22 has a future length equal to FLEN then if the sequence number falls within the range {S-HLEN+1, S+FLEN} then the sequence number is accepted.

The node then determines if the sequence number falls within the history range 20, or the future range 22 (step 105).

If the sequence number is within the future range 22, then the sequence number becomes the new latest sequence number S (step 106) and the RecovSeqNum variable is updated. The predetermined range 20, 22 therefore shifts in the sequence recovery space. For the next packet received at the node, the predetermined range 20, 22 is defined relative to the new latest sequence number S. The sequence history bit vector is also updated (i.e. to store the sequence number in the node's memory) according to the IEEE 802.1CB standard.

If the sequence number is within the history range 20 then the node determines whether the sequence number has already been received at the node (step 107). If the sequence number has already been received at the node then the packet is discarded as a duplicate packet (step 108). Otherwise, the accepted packet is kept (step 109) and the sequence history bit vector is updated according to the IEEE 802.1CB standard.

This process is then repeated for all subsequent packets received at the node, until the sequence generation function is reset.

As the history range 20 has a length that is equal to the history length (HLEN), as in the IEEE 802.1CB standard, then the present disclosure has the same tolerance as the standard for dealing with packets arriving out of order (i.e. packets with an earlier or lower sequence number arriving at the node after a later sequence number has already been received). However, as the future range 22 is larger than is defined in the standard, the present disclosure provides a greater tolerance for receiving packets with a later sequence number than expected. This is particularly important in networks where the sequence generation and recovery functions are identified based on the source address, as described above.

Accordingly, there has been described a sequence recovery method executed by a node in a time-sensitive network and configured to transmit and receive packets, the method comprising receiving a packet having a sequence number, determining whether the sequence number is within a predetermined range of a reference sequence number, wherein the reference sequence number is a current latest sequence number accepted at the node, and wherein the predetermined range comprises a history range and a future range, wherein the history range has a length equal to a history length and includes the reference sequence number and a predetermined number of consecutive sequence numbers that are immediately earlier than the reference sequence number, and the future range has a length equal to a future length and defines a predetermined number of consecutive sequence numbers that are immediately later than the reference sequence number, wherein the future length is greater than the history length. If the sequence number is outside of the predetermined range, the packet is discarded. If the sequence number is within the predetermined range, the packet is accepted.

Although particular embodiments of this disclosure have been described, it will be appreciated that many modifications/additions and/or substitutions may be made within the scope of the claims.

The invention claimed is:

1. A sequence recovery method executed by a node in a time-sensitive network and configured to transmit and receive packets, the method comprising:
   receiving a packet having a first sequence number;
   determining whether the first sequence number is within a predetermined range of a reference sequence number, wherein the reference sequence number is a current latest sequence number accepted by the node and wherein the predetermined range comprises a history range and a future range, wherein the history range has a length equal to a history length and includes the reference sequence number and a predetermined number of consecutive sequence numbers that are immediately earlier than the reference sequence number, and the future range has a length equal to a future length and defines a predetermined number of consecutive sequence numbers that are immediately later than the reference sequence number, wherein the future length is greater than the history length;
   in response to the first sequence number being outside of the predetermined range, discarding the packet; and
   in response to the first sequence number being within the predetermined range, accepting the packet.

2. The sequence recovery method of claim 1, further comprising updating the reference sequence number to be the first sequence number in response to the first sequence number being within the future range.

3. The sequence recovery method of claim 1 or claim 2, further comprising:
   in response to the first sequence number being within the future range, updating a sequence history bit vector to store the first sequence number, wherein the sequence history bit vector has a length equal to the history length.

4. The sequence recovery method of claim 1 or claim 2, further comprising:
   in response to the packet being within the history range, determining if the first sequence number has already been received by the node; and
   in response to determining that the first sequence number has already been received by the node, discarding the packet.

5. The sequence recovery method of claim 4, further comprising:
   in response to determining that the first sequence number has not already been received by the node, updating a sequence history bit vector to store the first sequence number, wherein the sequence history bit vector has a length equal to the history length.

6. The sequence recovery method of any preceding claim, wherein the future length is defined independently of the history length.

7. The sequence recovery method of any preceding claim, wherein the future length is set by the user.

8. The sequence recovery method of any preceding claim, wherein the method complies with the IEEE 802.1CB standard vector sequence recovery algorithm.

9. The sequence recovery method of any preceding claim, wherein the reference sequence number is defined by a RecovSeqNum variable.

10. A node for a time-sensitive network and configured to transmit and receive packets, the node comprising:
   a receiver;
   a processor; and
   a memory, configured to store:
     a set of sequence numbers;
     a history length; and
     a future length;
   wherein the processor is configured to:
     in response to the receiver receiving a packet having a first sequence number, determine whether the first sequence number is within a predetermined range of a reference sequence number, wherein the reference sequence number is a current latest sequence number stored in the memory and wherein the predetermined range comprises a history range and a future range, wherein the history range has a length equal to the history length and includes the reference sequence number and a predetermined number of consecutive sequence numbers that are immediately earlier than the reference sequence number, and the future range has a length equal to the future length and defines a predetermined number of consecutive sequence numbers that are immediately later than the reference sequence number, wherein the future length is greater than the history length;
     in response to the first sequence number being outside of the predetermined range, discard the first packet; and
     in response to the first sequence number being within the predetermined range, accept the first packet.

11. The node of claim 10, wherein the processor is configured to perform the sequence recovery method of any of claims 2 to 9.

12. The node of claim 10 or claim 11, wherein the node is a networking device or a bridge.

13. A time-sensitive network comprising a plurality of inter-connected nodes according to any of claims 10 to 12.

14. The time-sensitive network of claim 13, wherein the time-sensitive network is an in-vehicle network.

15. A vehicle comprising an in-vehicle network according to claim 14.

* * * * *